May 19, 1953 D. J. FERRIER 2,639,329

AMPLIFYING APPARATUS FOR USE WITH TELEPHONES

Filed March 27, 1951 2 Sheets-Sheet 1

Inventor:
David John Ferrier by [signature]
Attorney.

May 19, 1953 D. J. FERRIER 2,639,329

AMPLIFYING APPARATUS FOR USE WITH TELEPHONES

Filed March 27, 1951 2 Sheets-Sheet 2

INVENTOR:
DAVID JOHN FERRIER

BY [signature]
ATTORNEY

Patented May 19, 1953 2,639,329

UNITED STATES PATENT OFFICE 2,639,329

AMPLIFYING APPARATUS FOR USE WITH TELEPHONES

David J. Ferrier, St. Kilda, Victoria, Australia

Application March 27, 1951, Serial No. 217,722

6 Claims. (Cl. 179—1)

This invention relates to an amplifying apparatus for use with telephones whereby the incoming call is amplified and the call answered without the necessity of listening to or speaking directly into the telephone receiver or transmitter.

In using hand-set telephones of the standard type it is frequently inconvenient to hold the line until the caller or party being called transmits their message, accordingly considerable advantages would arise, particularly in the saving of time, if it were possible to receive an amplified reproduction of the incoming message without holding the receiver or in any way altering or interfering with the standard telephone equipment, which latter practice seldom meets with the approval of the authorities controlling public telephone communication systems.

The principal objective of the present invention is to provide an amplifying apparatus for use with telephones whereby an amplified reproduction of the incoming message is achieved without requiring any alteration to standard telephone equipment.

A further objective of the invention is to provide a mechanical voice intensifier with the apparatus to enable answers to the incoming message to be directed to the telephone transmitter.

Various other objects and advantages will be apparent as the nature of the invention is more fully disclosed.

Although the novel features which are believed to be characteristic of this invention will be more particularly pointed out in the claims appended hereto, the invention itself may be better understood by referring to the following description, taken in connection with the accompanying drawings, in which a specific embodiment thereof has been set forth for purposes of illustration. In these drawings:

Figure 1:
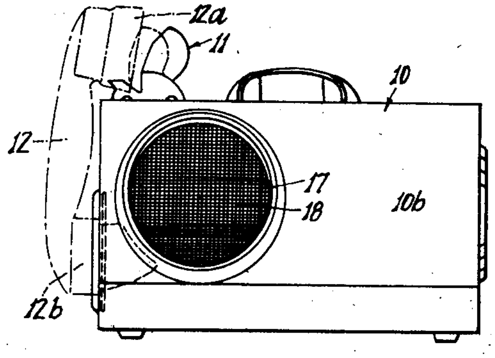
Figure 1 is a front elevation of the apparatus showing the telephone transmitter-receiver hand-set in operative position on the apparatus.
Figure 2:
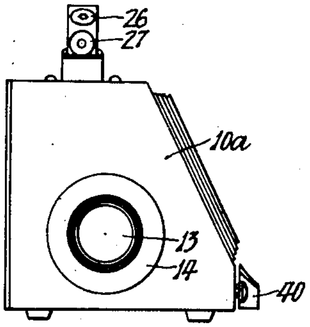
Figure 2 is a view in side elevation of Figure 1 from the left hand side.

As illustrated in the drawings, the apparatus comprises a metal casing 10 having on the top and adjacent one end thereof a cradle indicated generally at 11 to receive the earpiece 12*a* of a telephone transmitter-receiver hand-set 12. The mouthpiece of the transmitter 12*b* of the hand-set fits into an opening 13 in the end wall 10*a* of the casing 10. The opening 13 is provided in a rubber or like grommet 14 which ensures that the mouth-piece of the transmitter 12*b* fits snugly into the opening 13. The inner portion 15 of the grommet 14 is connected to the inner end of a horn 16 which may be a tortuous exponential horn or other suitable shape. The outer end of the horn 16 registers with an opening 17 in the front face 10*b* of the casing 10. The opening 17 may be covered with a gauze 18 or screened in any suitable manner.

Figure 3:
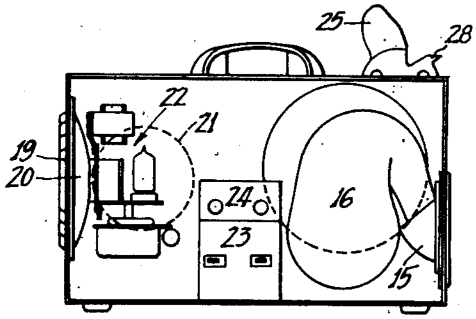
Figure 3 is a rear elevation with the cover plate removed.
Figure 4:
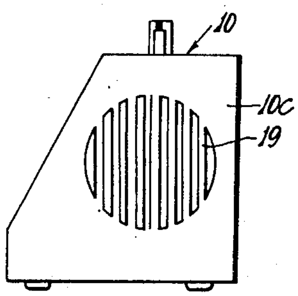
Figure 4 is a view in side elevation from the right hand side of Figure 1.
Figure 5:
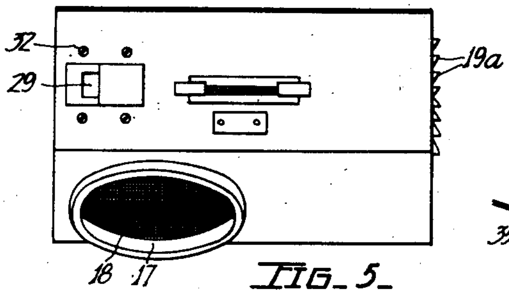
Figure 5 is a plan view.

The other end 10*c* of the casing 10 is provided with a louvered opening 19 behind which is a loud-speaker 20. The louvres 19*a* of the opening 19 are arranged to be outwardly inclined from the centre louvre to provide sound diffusion and assist in the prevention of acoustical feedback. An opening 21 (shown in broken lines in Figure 3) is provided in the rear of the casing 10 to assist in the elimination of acoustic feed-back to prevent resonance within the casing and to provide ventilation.

Also positioned in the casing 10, rearwardly of the loud-speaker 20, is a four valve amplifier indicated generally at 22. Electrical energy may be obtained from dry batteries 23 and 24 located in the casing 10 or energy may be obtained from the mains.

Figure 6:
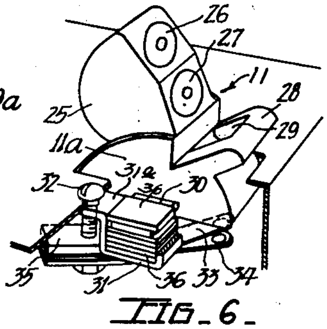
Figure 6 is a detail perspective view partly in section of the hand-set rest and signal pick-up.

The cradle 11 in which the ear-piece 12*a* rests, comprises a bell-crank member moulded from suitable synthetic plastic material and secured to the top of the casing 10. The upstanding arm 25 of the bell-crank contains an electrical pick-up device comprising two series-connected coils of fine gauge wire wound on iron-cored bobbins and covered by insulating plates 26, 27. The lower arm 28 of the bell crank contains a recess 29 which allows the ear-piece to move automatically to a central position when placed on the bell crank as shown in Figure 1. The lower portion 11*a* of the bell crank is made hollow for a purpose referred to hereinafter. The bell crank is pivotally mounted on the casing 10 by means of flat pivot projections 30 which are moulded integrally with the bell crank, and project laterally from each side thereof. The pivot projections 30 extend laterally from the bell crank underneath the top of the casing 10 and are supported on each side by a U-shaped bracket 31 having outwardly directed flanges 31a which are attached to the underside of the top of the casing 10 by bolts 32. For the sake of clarity, only one half of the U-shaped bracket 31 is shown in Figure 6. One of the bolts 32 also carries a pair of leaf contacts 33, 34 which are mounted between strips of insulating material 35. The free end of the upper contact 33 is biased uywardly so as to be normally clear of the contact 34 but projects under the bell-crank so that depression of the latter by the weight of the telephone hand-set, forces the contact 33 into engagement with contact 24. The switch formed by contacts 33, 34 is located in circuit with the amplifier 22 so that the amplifier is energized only when the switch is closed.

Soft rubber material 36, preferably of the type known as latex foam, is disposed above and below the projections 30 so that the bell crank is entirely supported on rubber and does not make contact with any metallic part of the apparatus except the leaf spring 33 of the switch. The recess 29 is positioned in the lower arm 28 so that the center of gravity of a telephone hand-set supported on the lower arm will be displaced from the projections 30 to provide a rocking moment about said projections. The mounting of the projections 30 enables the bell crank to move with a limited angular movement about the pivot as well as permitting limited vertical and horizontal displacement and limited lateral rocking movements. When the ear-piece 12a of a telephone hand-set is placed in the cradle 11 so that the weight of the hand-set is mainly supported by the lower arm 28, the bell crank is pivoted in an anti-clockwise direction, as viewed in Figure 1, and in the clockwise direction, as viewed in Figure 6, so that the arm 25 moves into close engagement with the ear-piece and is retained in that position. The various possible movements of the bell crank referred to above ensure that the bell crank accommodates itself to any particular ear-piece so that the coils of the pick-up device are held as close as possible to the front face of the ear-piece.

Figure 7:
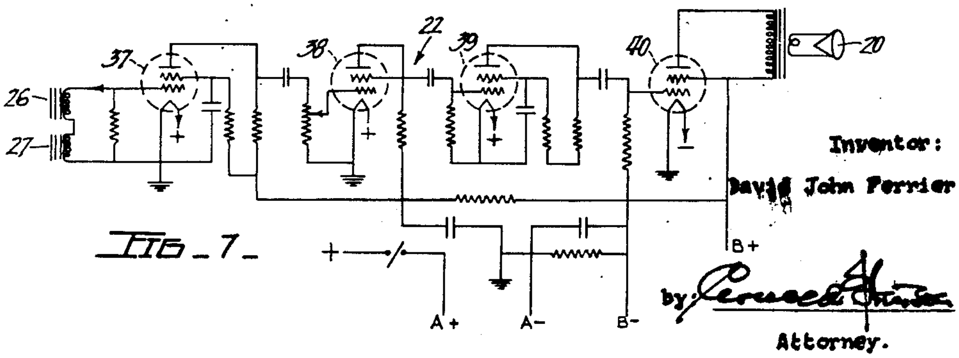
Figure 7 is a diagrammatic view of the circuit for amplifying the signals induced in the pick-up.

Upon depression of the arm 28, the switch contacts 33, 34 are closed in the manner described above, thus energizing the filaments of the resistance coupled valves 37, 38, 39 and 40 of the amplifier hook-up 22 diagrammatically shown in Figure 7.

In use of the apparatus above described, the hand-set 12 of the telephone is placed with the ear-piece 12a in the cradle 11 and the mouth-piece of the transmitter 12b in the opening 13 as above described, when it is desired to receive or transmit a message through the telephone.

The positioning of the hand-set in this manner effects closing of the switch contacts 33, 34 by depression of the arm 28, to energize the filament circuit of the amplifier 22, the output of which is adjusted by the volume control 40 thus permitting conversations to be adjusted as required.

Magnetic variations caused by an incoming message in the telephone receiver pole pieces (not shown) induce an E. M. F. in the coils of the pick-up device which is imparted to the grid circuit of the valve 37 of the amplifier 22, such signal being amplified and reproduced by the loud-speaker 20.

As telephone ear-pieces vary slightly in dimensions the adjusting movements permitted by the pivot mounting of the bell crank carrying the pick-up coils, enable the air-gap between the said coils and the pole pieces to be as small as possible, thus assisting the coils in picking up the incoming message in the hand-set 12. The advantages of using a pick-up device operated by the magnetic variations of a telephone ear-piece are such that the pick-up device is not responsive to sound and consequently the difficulty of acoustic feed-back into the receiver is overcome. In addition, the rubber mounting of the cradle 11 and the seating of the mouth-piece 12b in the rubber or like grommet 14 eliminates the effect of mechanical vibration transmitted through the casing.

It has been found by experiment that the arrangement of the outwardly deflected louvres 19a of the loud-speaker opening 19 play an important part in the elimination of acoustic feed-back. The opening 21 at the rear of the casing 10 may also assist in eliminating feed-back and resonance within the casing as well as directing the sound from the loud speaker in more than one direction.

An answer to an incoming message can be effected by speaking into the horn 16 which provides mechanical intensification of the voice for transmission through the telephone transmitter 12b. The horn 16 is preferably designed to follow an exponential curve in order to provide an efficient sound intensifying device. As a further measure to avoid internal resonance, the interior of the cabinet may be lined with felt or other sound-absorbing material.

Figure 8:
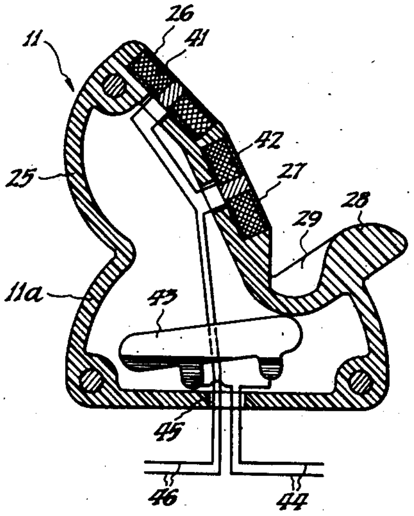
Figure 8 is a vertical sectional view of the hand-set support constructed according to the present invention and showing a switch arrangement which is alternative to that shown in Figure 6.

If the current and voltage required by the valves of the amplifier are such that a switch having leaf-type contacts is not suitable for use in controlling the operation of the amplifier, a mercury switch may be used instead. Figure 8 shows a cradle 11 comprising a bell crank member having at least the lower portion 11a thereof hollowed out and including an upstanding arm 25 and a lower arm 28. The lower arm 28 is formed with a recess 29, as in the previously described embodiment, for receiving the ear-piece of a telephone hand-set which is to be supported. The arm 25 carries two series-connected coils 41 and 42 of fine gauge wire wound on iron-cored bobbins and covered by insulating plates 26 and 27. Circuit connections 46 are provided for the coils 41 and 42 and pass through a suitable opening 45 in the base of the lower arm 28. A mercury switch 43 in series with the amplifier is mounted within the hollow lower portion 11a of the bell-crank with the leads 44 from the contacts of the switch 43 also passing through the opening 45.

The mercury switch 43 is disposed within the bell-crank so that the contacts thereof are electrically separated from each other when the bell crank is in its normal position (Figure 8), that is, in the position which the bell crank assumes without a hand-set supported thereon. When however the bell crank is tilted under the weight of a telephone hand-set, the corresponding angular movement of the mercury switch is arranged to energize the amplifier as is effected by the closing of the leaf contacts 33, 34 previously referred to. When a mercury switch is used, the leaf contacts 33, 34 can of course be eliminated.

An apparatus as above described is relatively economical of manufacture and provides an efficient telephone accessory which has the particular advantage that in use, no interference with existing telephone equipment is necessary and by reason of compactness and portability may be used with any telephone of the hand-set type without the necessity of obtaining the approval of the telephone communication autorities.

I claim:

1. In amplifying apparatus for use with a telephone instrument of the hand-set type having a mouth-piece and an ear-piece; a cabinet having a vertical exterior wall, a two-armed bell crank member, flat pivot projections extending laterally from one arm of said bell crank member, supporting brackets for said projections secured to said cabinet adjacent the upper portion of said vertical wall, resilient packing material between said flat pivot projections and said supporting brackets to cushion resiliently the projections in the brackets, an inductive pick-up device mounted in the other arm of the bell crank member, said one arm of the bell crank member being formed to support the telephone ear-piece whereby the mouth-piece hangs downwardly below said bell crank member and the arm of the bell-crank member carrying the inductive pick-up device is urged by the weight of the telephone instrument to lie against the front face of the ear-piece, said vertical wall of the cabinet having an opening into which the mouth-piece of the hand-set projects when the ear-piece of the telephone instrument is supported by said bell crank member, a resilient seating member for the mouth-piece of the telephone instrument in said opening in the vertical wall of the cabinet, an amplifier in the cabinet, electric circuit connections between said amplifier and said inductive pick-up device, a loudspeaker in the cabinet, electric circuit connections between the amplifier and the loudspeaker and a tubular member in the cabinet positioned to pick up local sound and to conduct the same to said opening in the vertical wall of the cabinet for communication to the mouthpiece of a telephone instrument positioned in said opening.

2. In amplifying apparatus for use with a telephone instrument of the hand-set type having a mouth-piece and an ear-piece; a cabinet, a two-armed bell crank member, flat pivot projections extending laterally from one arm of said bell crank member, supporting brackets for said projections secured to said cabinet, resilient packing material between said flat pivot projections and said supporting brackets to cushion resiliently the projections in the brackts, an inductive pick-up device mounted in the other arm of said bell crank member, said one arm of the bell crank member being formed to support the telephone ear-piece whereby the mouth-piece hangs downwardly below said member and the arm of the bell-crank support carrying the inductive pick-up device is urged by the weight of the telephone instrument to lie against the front face of the ear-piece, said cabinet having an opening positioned to receive the mouth-piece of the telephone instrument when the ear-piece of the instrument is supported on the bell crank member, a resilient grommet positioned in said opening to cushion said mouth-piece, an amplifier in the cabinet, electric circuit connections between the amplifier and said inductive pick-up device including switch means operable in one sense to energize said amplifier when the telephone instrument is placed on the bell crank member and operable in the opposite sense to de-energize said amplifier when the telephone instrument is removed from the bell crank member, a loudspeaker in the cabinet, electric circuit connections between the amplifier and the loudspeaker and an acoustical amplifier positioned to pick up local sound and to conduct the same to said opening in the cabinet for communication to the mouth piece of a telephone instrument positioned in said opening.

3. In amplifying apparatus for use with a telephone instrument of the hand-set type having a mouth-piece and an ear-piece; a cabinet having a vertical exterior wall, a two-armed bell crank member, flat pivot projections having upwardly and downwardly facing flat sides projecting laterally from one arm of said bell crank member, resilient packing material above and below said projections to cushion the projections, the bell crank member being supported entirely by the said projections, brackets secured to said cabinet to support said resilient packing material, an inductive pick-up device mounted in the other arm of said bell crank member, said one arm of the bell crank member being formed to support the telephone ear-piece whereby the mouth-piece hangs downwardly below said bell crank member with its center of gravity displaced from said pivot projections so that the arm of the bell-crank member carrying the inductive pick-up device is urged by the weight of the telephone instrument to lie against the front face of the ear-piece, said vertical wall of the cabinet having an opening into which the mouth-piece of the hand-set projects when the ear-piece of the telephone instrument is supported by said bell crank member, an amplifier in the cabinet, electric circuit connections between said amplifier and said inductive pick-up device including normally open switch contacts mounted beneath said bell crank member and disposed in relation thereto whereby they are closed to energize the amplifier when said bell crank member is rocked by placement of the telephone instrument on the bell crank member, a loudspeaker in the cabinet, electric circuit connections between the amplifier and the loudspeaker and an acoustical amplifier positioned to pick up local sound and to conduct the same to said opening in the cabinet for communication to the mouthpiece of a telephone instrument placed in said opening.

4. In amplifying apparatus for use with a telephone instrument of the hand-set type having a mouth-piece and an ear-piece; a cabinet, a bell-crank member having an upper arm and a lower arm, an inductive pick-up device mounted in the upper arm of the bell crank member, the lower arm of the bell crank member being formed to support the telephone ear-piece whereby the mouth-piece hangs downwardly below said member and the upper arm of the bell-crank member is urged by the weight of the telephone instrument to lie against the front face of the ear-piece, said cabinet having an opening positioned to receive the mouth-piece of a telephone instrument when the ear-piece of the instrument is supported on said lower arm of the bell crank member, a resilient grommet positioned in said opening to cushion said mouth piece, pivot projections extending laterally from the bell crank member, support means on said cabinet receiving said projections and resiliently resisting rotation of the bell crank member about said pivot projections whereby the bell crank member has only a limited angle of movement about said projections under the influence of the weight of the telephone instrument and will return to its original position when the telephone instrument is removed from the bell crank member, an amplifier in the cabinet, electric circuit connections between the amplifier and said inductive pick-up device including switch means responding to rocking of said bell crank member and operable in one sense to energize said amplifier when the telephone instrument is placed on the bell crank member and operable in the opposite sense to de-energize said amplifier when the telephone instrument is removed from the bell crank member, a loudspeaker in the cabinet, electric circuit connections between the amplifier and the loudspeaker and an acoustical amplifier positioned to pick up local sound and to conduct the same to said opening in the cabinet for communication to the mouth-piece of a telephone instrument positioned in said opening.

5. In amplifying apparatus for use with a telephone instrument of the hand-set type having a mouth-piece and an ear-piece; a cabinet, a hollow two-armed bell crank member, flat pivot projections extending laterally from said bell crank member, supporting brackets for the said projections secured to said cabinet, resilient packing material between said flat pivot projections and said supporting brackets to cushion resiliently the projections in the brackets, an inductive pick-up device mounted in one arm of the bell crank member, the other arm of the bell crank member being formed to support a telephone ear-piece whereby the mouth-piece hangs downwardly below said member with the center of gravity of the telephone instrument displaced from said pivot projections so that said bell crank member is rocked and the arm of the bell-crank member carrying the inductive pick-up device is urged by the weight of the telephone instrument to lie against the front face of the ear-piece, said cabinet having an opening positioned to receive the mouth-piece of the telephone instrument when the ear-piece of the instrument is supported on the bell crank member, a resilient grommet positioned in said opening to cushion said mouth-piece, an amplifier in the cabinet, electric circuit connections between the amplifier and said inductive pick-up device including mercury switch means disposed within said hollow bell crank member to rock with the latter and operable in one sense to energize said amplifier when the telephone instrument is placed on the bell crank member and operable in the opposite sense to de-energize said amplifier when the telephone instrument is removed from the bell crank member, a loudspeaker in the cabinet, electric circuit connections between said amplifier and said loudspeaker and an acoustical amplifier positioned to pick up local sound and to conduct the same to said opening in the cabinet for communication to a mouth-piece positioned in said opening.

6. In amplifying apparatus for use with a telephone instrument of the hand-set type having a mouth-piece and an ear-piece; a cabinet, a hollow bell crank member having an upper arm and a lower arm, an inductive pick-up device mounted in said upper arm of the bell crank member, the lower arm of the bell crank member being adapted to support the telephone ear-piece whereby the mouth-piece hangs downwardly below said member and the upper arm of the bell crank member is urged by the weight of the telephone instrument to lie against the front face of the ear-piece, said cabinet having an opening positioned to receive the mouth-piece of the telephone instrument when the ear-piece of the instrument is supported on the lower arm of the bell crank member, a resilient grommet positioned in said opening to cushion said mouth-piece, pivot projections extending laterally from the bell crank member in locations displaced from the center of gravity of a telephone instrument supported on said lower arm of the bell crank member, support means adapted resiliently to resist rotation of the bell crank member about said pivot projections whereby the bell crank member has only a limited angle of movement about said projections under the influence of the weight of the telephone instrument and returns to its original position when the telephone instrument is removed from the bell crank member, an amplifier in said cabinet, electric circuit connections between said amplifier and said inductive pick-up device including mercury switch means disposed within the hollow bell crank member for movement with the latter and operable in one sense to energize said amplifier when the telephone instrument is placed on the bell crank member and operable in the opposite sense to de-energize said amplifier when the telephone instrument is removed from the bell crank member, a loudspeaker in said cabinet, electric circuit connections between said amplifier and loudspeaker and an acoustical amplifier positioned to pick up local sound and to conduct the same to said opening in the cabinet for communication to the mouth-piece of a telephone instrument positioned in said opening.

DAVID JOHN FERRIER.

References Cited in the file of this patent

UNITED STATES PATENTS

| Number | Name | Date |
| --- | --- | --- |
| 2,160,829 | Cherry | June 6, 1939 |
| 2,500,264 | Souget | Mar. 14, 1950 |
| 2,501,212 | Cunow | Mar. 21, 1950 |
| 2,501,955 | McWane | Mar. 28, 1950 |
| 2,528,636 | Cisin | Nov. 7, 1950 |
| 2,543,761 | Chirtie | Mar. 6, 1951 |